Oct. 10, 1967 R. G. DUNLOP 3,345,956
FREIGHT BRACING APPARATUS
Filed April 20, 1965
7 Sheets-Sheet 1
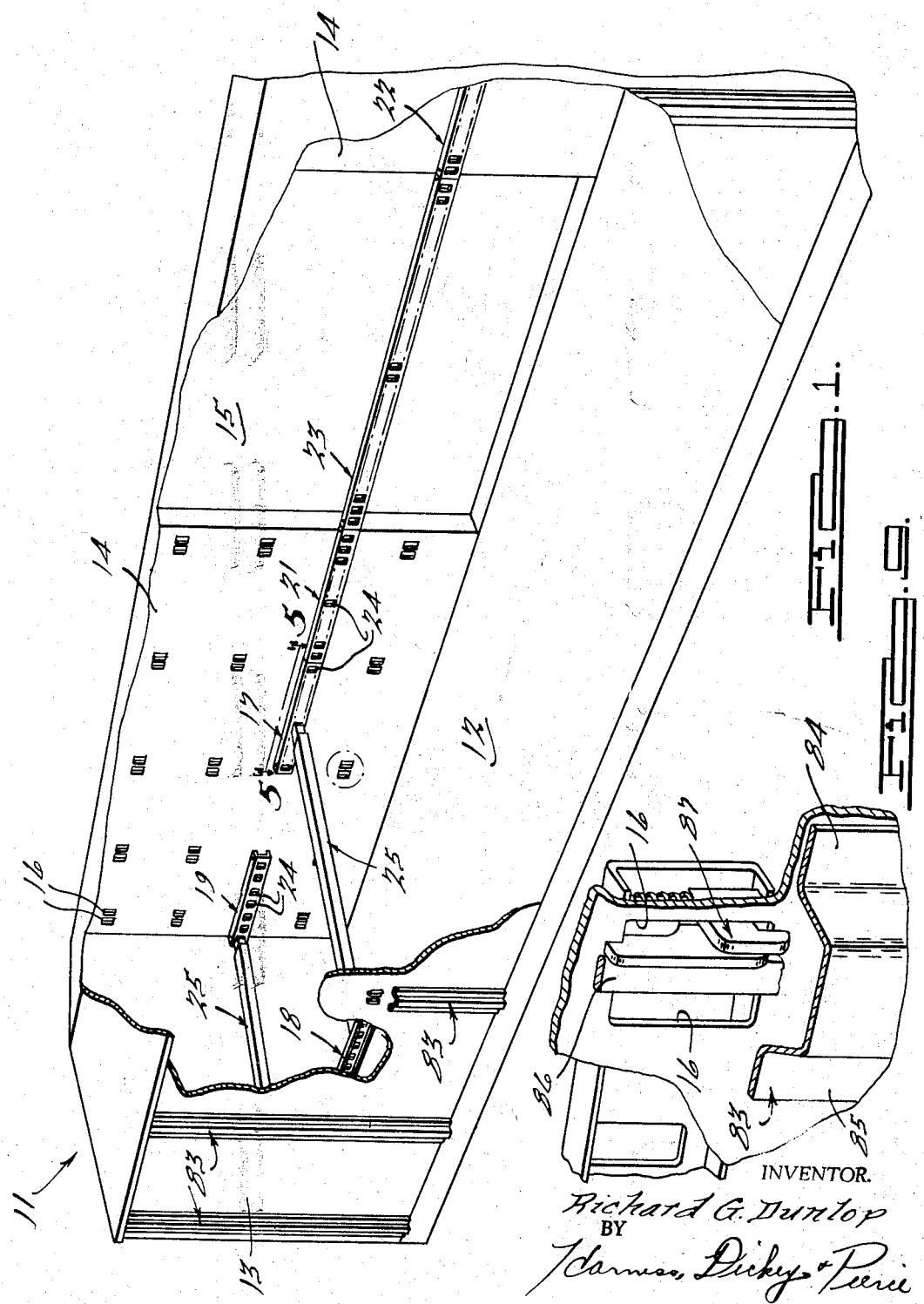
INVENTOR.
Richard G. Dunlop
BY
Harness, Dickey & Pierce
ATTORNEYS.

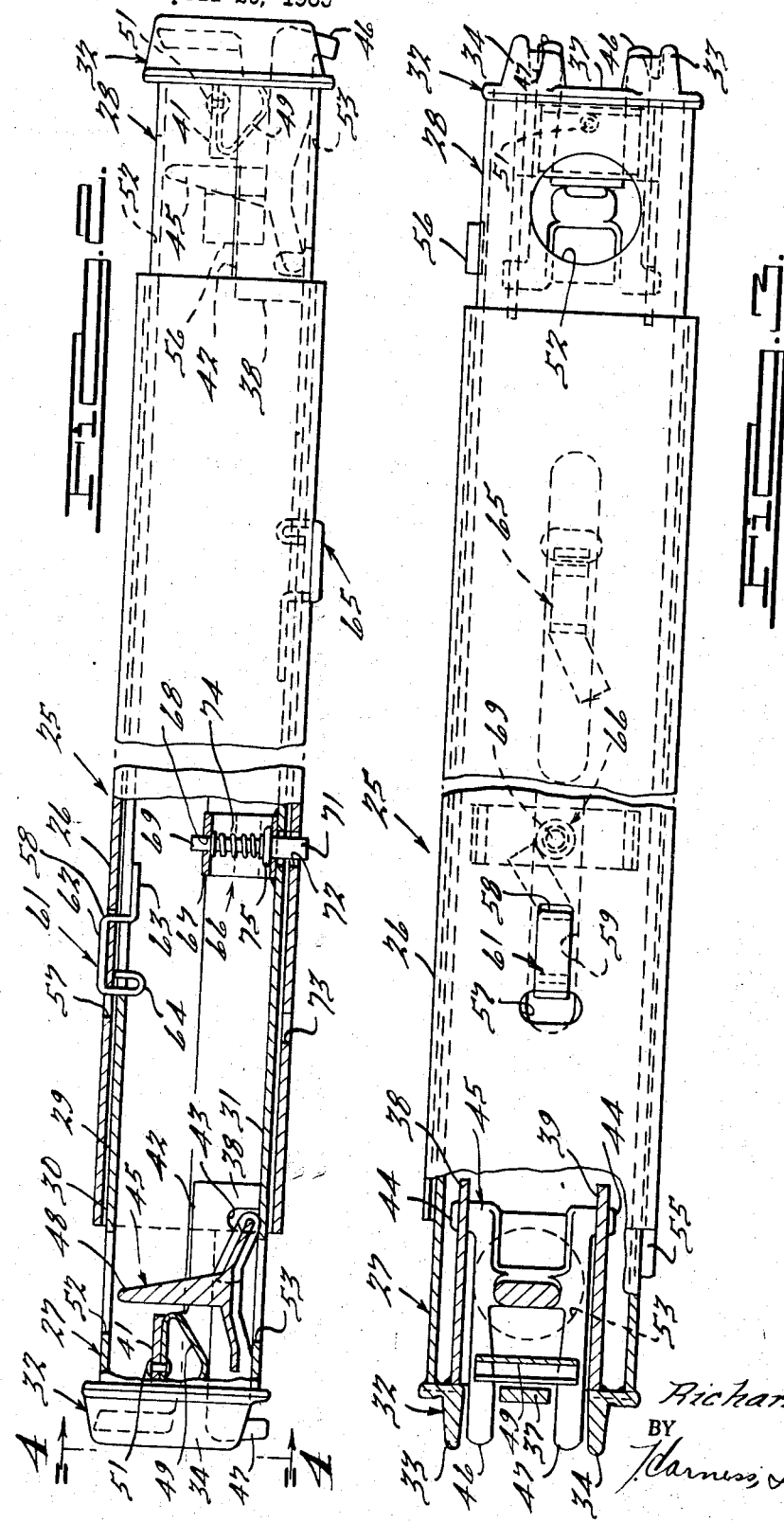

Oct. 10, 1967     R. G. DUNLOP     3,345,956
FREIGHT BRACING APPARATUS
Filed April 20, 1965     7 Sheets-Sheet 3
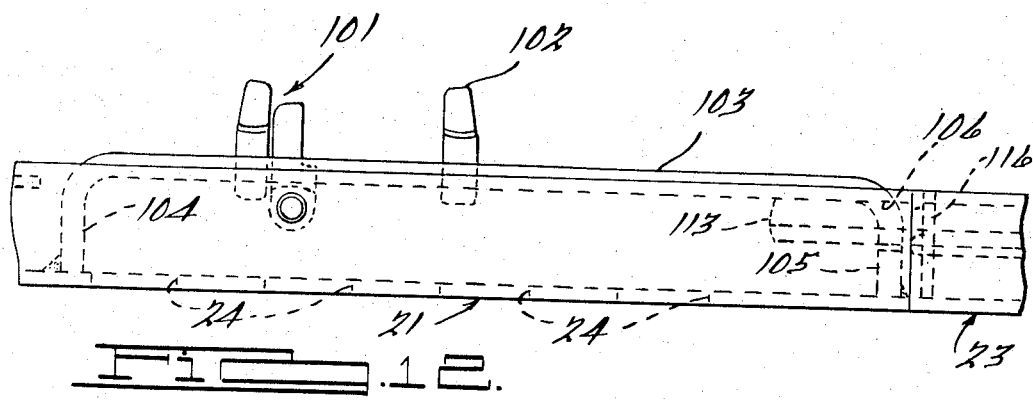
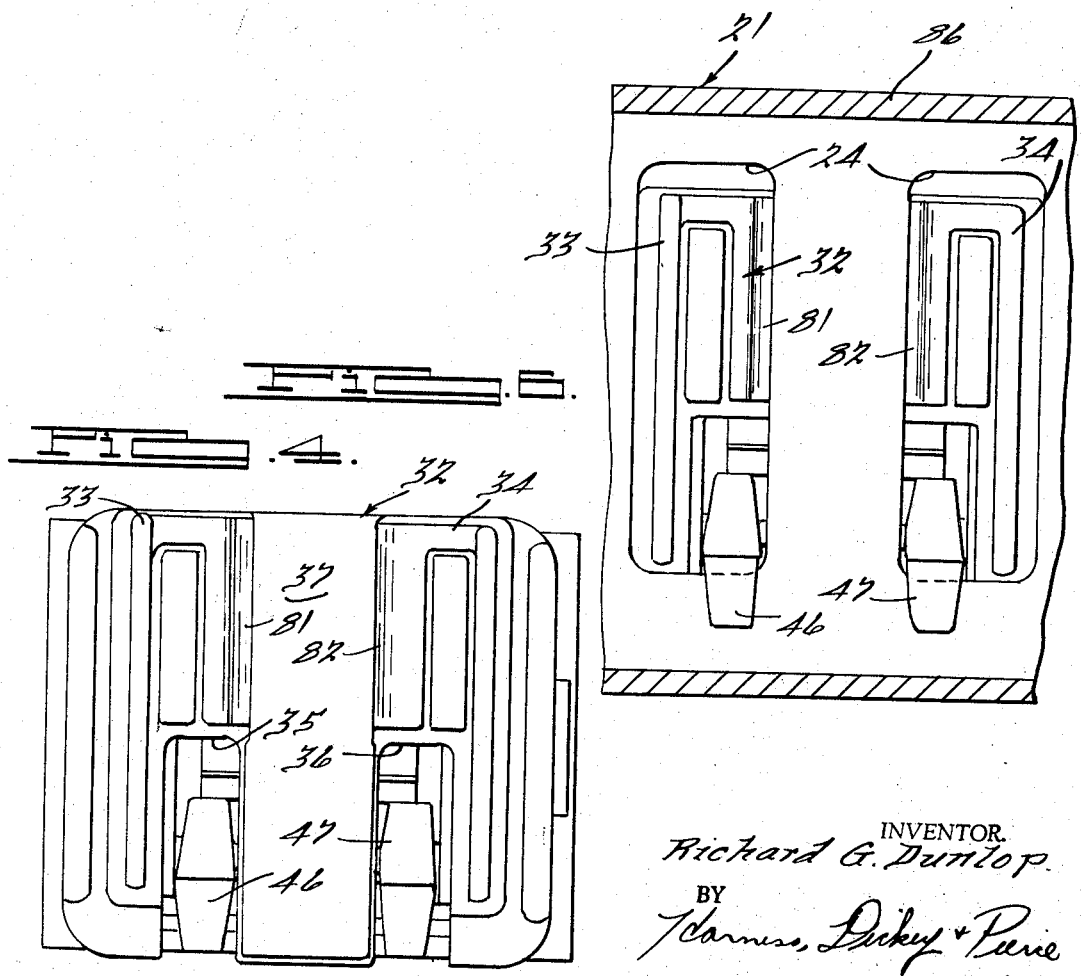
INVENTOR.
Richard G. Dunlop.
BY
Harness, Dickey & Pierce
ATTORNEYS.

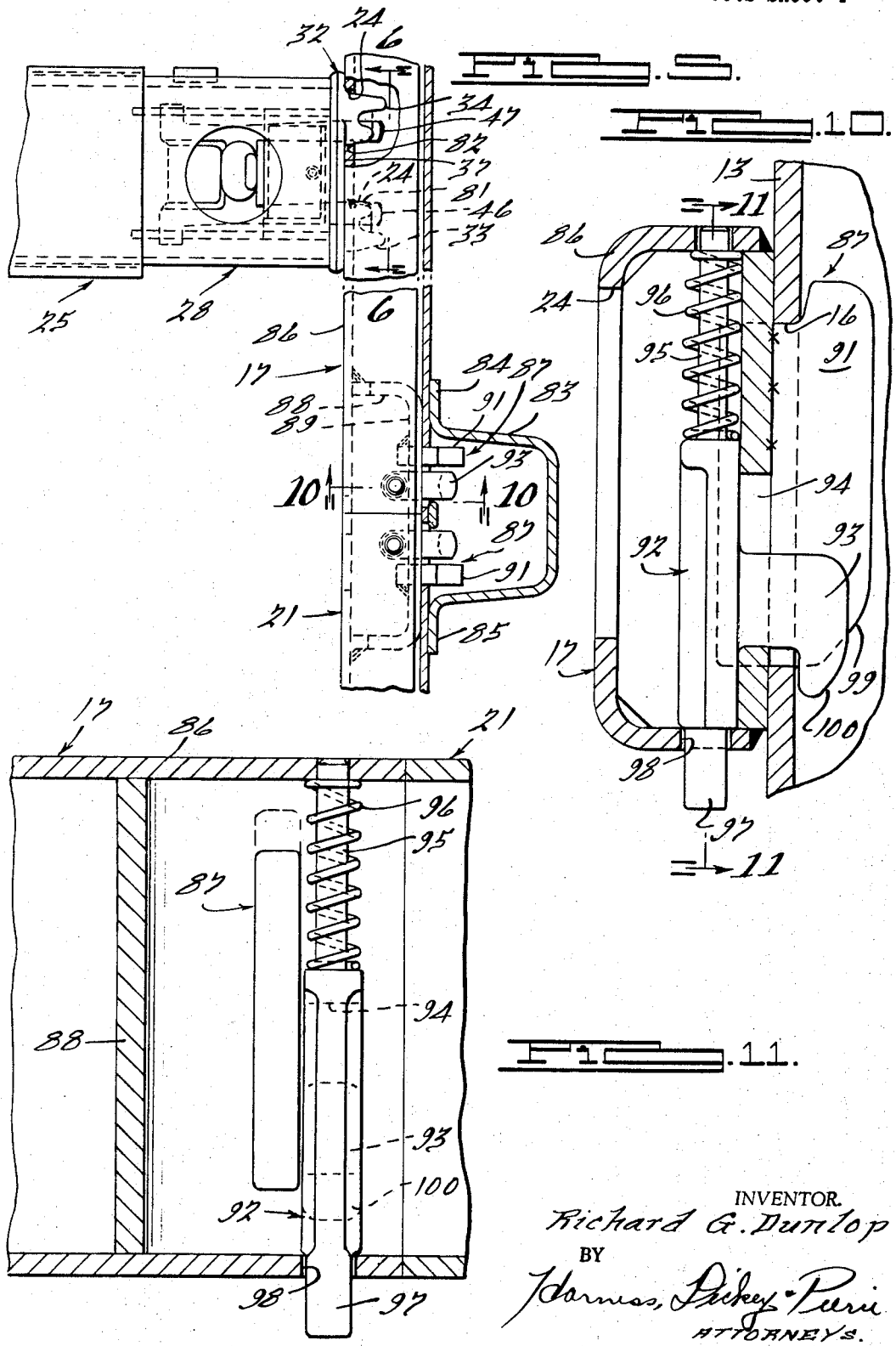

Oct. 10, 1967  R. G. DUNLOP  3,345,956
FREIGHT BRACING APPARATUS
Filed April 20, 1965  7 Sheets-Sheet 5
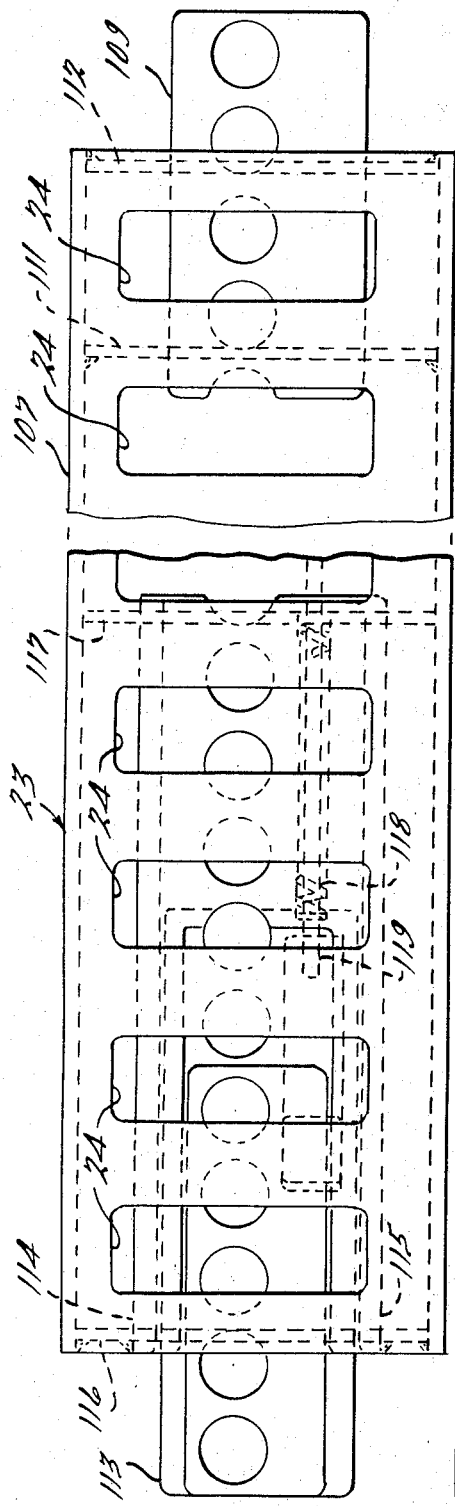
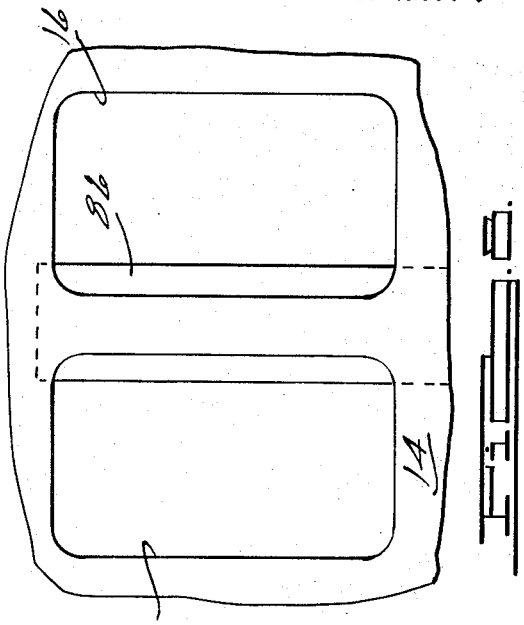
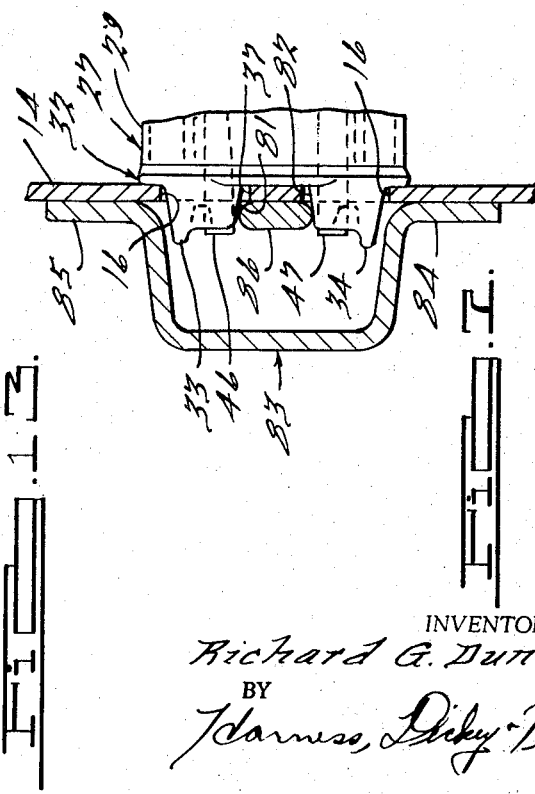
INVENTOR.
Richard G. Dunlop
BY
Harness, Dickey & Pierce Oct. 10, 1967 R. G. DUNLOP 3,345,956
FREIGHT BRACING APPARATUS
Filed April 20, 1965 7 Sheets-Sheet 6

INVENTOR.
Richard G. Dunlop
BY
Harness, Dickey & Pierce
ATTORNEYS.

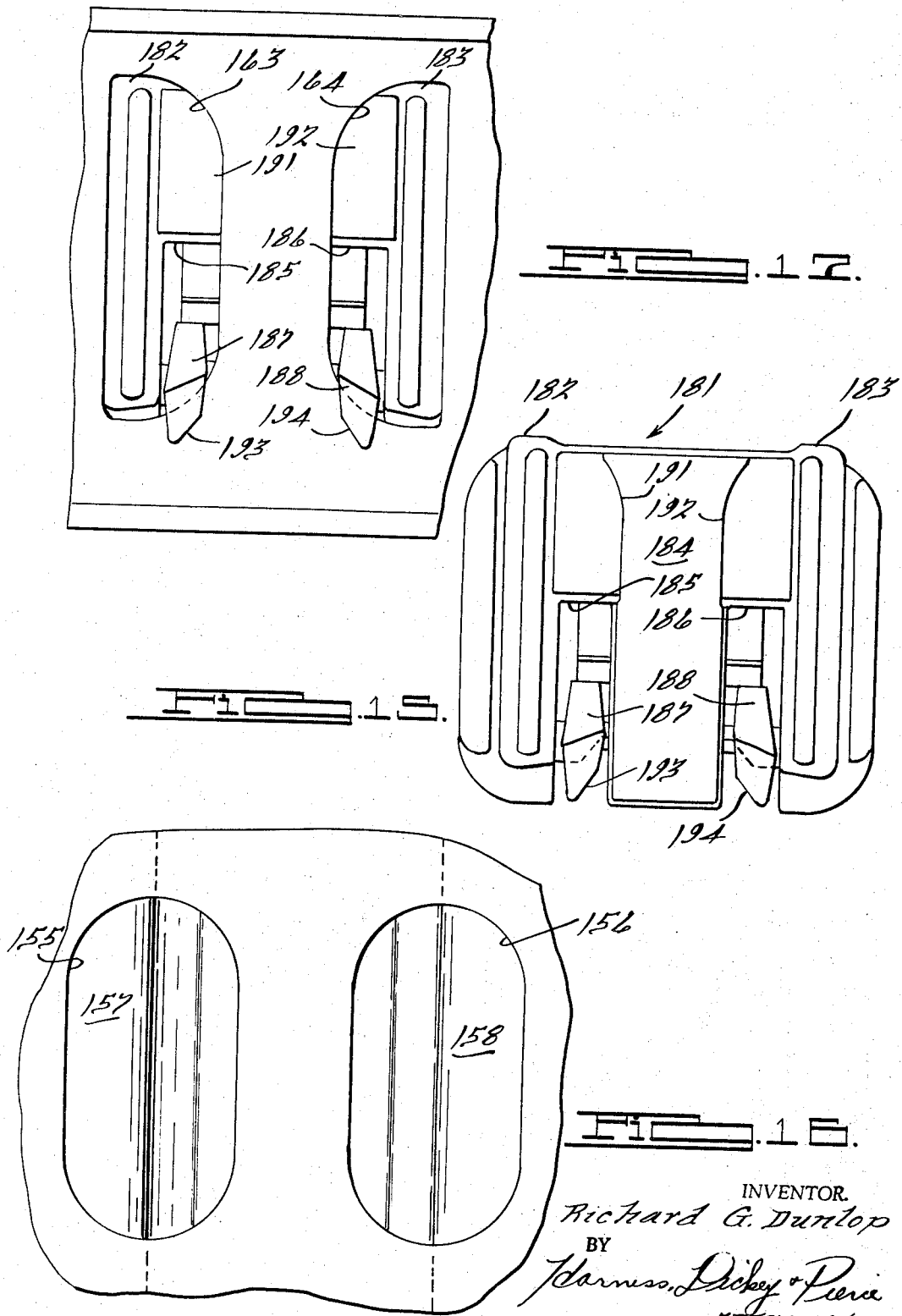

United States Patent Office 3,345,956
Patented Oct. 10, 1967

3,345,956
FREIGHT BRACING APPARATUS
Richard G. Dunlop, Livonia, Mich., assignor to Evans Products Company, a corporation of Delaware
Filed Apr. 20, 1965, Ser. No. 449,470
2 Claims. (Cl. 105—369)

The present invention relates to freight bracing apparatus and more particularly to an improved freight bracing apparatus for use in supporting and bracing freight in railway freight cars, trucks or other freight receiving chambers.

The type of freight bracing apparatus wherein a crossbar spans a pair of spaced walls to brace freight within a freight receiving chamber is well known. The crossbar normally employs end fittings that enable its connection to the walls or to some other member that is affixed to the walls. Normally the end fittings embody a latch mechanism so that the crossbar may be affixed at any of various locations to the side walls. Frequently, the latch mechanism is the only structural connection between the crossbar and the walls. Thus, the latch takes the full loading upon the crossbar rendering it subject to damage. In addition, if the load has shifted, the pressure exerted upon the latch may make it impossible to release it.

It, therefore, is an object of this invention to provide an improved latch mechanism for a freight bracing crossbar.

It is a further object of this invention to provide a latch mechanism for a crossbar end fitting that is protected from damage due to pressures exerted upon the crossbar.

The side walls of certain types of freight receiving chambers are formed with a plurality of spaced openings therein. These openings permit the attachment of freight bracing means so that the freight may be braced within the chamber. Quite frequently the spacing of the openings is such that the actual position of the loads within the compartment does not permit the freight bracing means to be attached at the face of the load.

It, therefore, is a further object of this invention to provide a freight bracing apparatus for use in a compartment having perforated walls that permits a finer adjustment of the direction of the bracing means.

One method by which the spacing between the wall perforations may be spanned is by attaching a wall member having more closely spaced perforations to the wall. The crossbar is then attached to the wall member to brace the freight within the compartment. The wall member normally projects into the chamber from the wall and thus the distance between the wall members is less than that between the walls. This normally necessitates the provision of different length crossbars.

It is a further object of this invention to provide a freight bracing apparatus including a crossbar that is adjustable for length so that it may be attached directly to the walls or may be attached to wall members that are supported by the walls.

The apertures in the walls that define the freight receiving area in different types of chambers may be different. For example, different railway lines often employ different shape holes in the walls of their cars. It is desirable to maintain uniformity of the bracing apparatus so that a maximum degree of interchangeability may be obtained. It also is desirable to provide a latch mechanism that may be engaged and released with a minimum degree of movement to simplify the latch actuating mechanism.

It is another object of this invention to provide a latch mechanism that is simple in operation.

It is a further object of the invention to provide an end fitting for a crossbar that is adaptable for receipt in different shape apertures.

A crossbar embodying this invention has an end fitting comprised of a locating member that is adapted to be inserted into an aperture in the wall of a freight receiving compartment. A latch mechanism is provided to lock the end fitting and crossbar within the aperture in which it has been inserted. The locating means is constructed and arranged to absorb the loads upon the crossbar so that the latch mechanism will be protected.

An end fitting and crossbar of the type described in the preceding paragraph may be used in conjunction with a freight receiving chamber having a plurality of apertures spaced along its walls. In order to provide a finer adjustment, a wall member is affixed to the wall at a pair of the spaced apertures and spans them. The wall member has a plurality of more closely spaced apertures into which the crossbar may be affixed. As a further feature of the invention, the crossbar may be adjustable between two different lengths so that it may be attached either to the wall members or directly to the walls.

Other objects and advantages of this invention will become more apparent as this description proceeds, particularly when considered in conjunction with the accompanying drawings, wherein:

FIGURE 1 is a perspective view of a portion of a railway car embodying this invention;

FIGURE 2 is an elevational view, with portions broken away, of the crossbar shown in FIGURE 1;

FIGURE 3 is a top plan view, with portions broken away, of the crossbar shown in FIGURE 2;

FIGURE 4 is an end view taken along the line 4—4 in FIGURE 2;

FIGURE 5 is a cross-sectional view taken along the line 5—5 of FIGURE 1;

FIGURE 6 is a cross-sectional view taken along the line 6—6 of FIGURE 5;

FIGURE 7 is a cross-sectional view, in part similar to FIGURE 5, showing an embodiment of the invention wherein the crossbar is affixed directly to a wall of a railway car;

FIGURE 8 is an elevational view of the encircled area in FIGURE 1;

FIGURE 9 is a perspective view of the inner surface of the railway car wall structure showing the attachment of the wall member;

FIGURE 10 is a cross-sectional view taken along the line 10—10 of FIGURE 5;

FIGURE 11 is an elevational view taken generally in the direction of the line 11—11 in FIGURE 10;

FIGURE 12 is a plan view showing the interconnection between the end member and the door member in FIGURE 1;

FIGURE 13 is an elevational view of the door member;

FIGURE 17 is a cross-sectional view, in part similar to FIGURE 6, showing the interconnection between the crossbar and the wall member of the embodiment of FIGURE 14.

FIGURE 18 is a cross-sectional view taken generally along the line 18—18 in FIGURE 14; and FIGURE 19 is a cross-sectional view taken along the line 19—19 in FIGURE 18.

Figure 14:
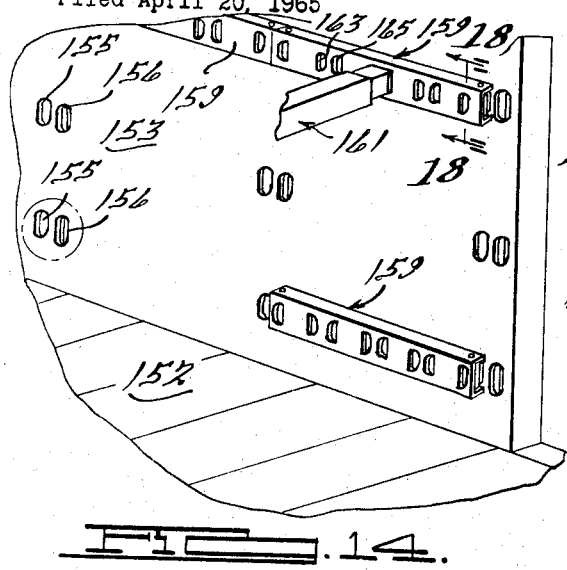
FIGURE 14 is a perspective view, in part similar to FIGURE 1, showing another embodiment of the invention.

Referring now in detail to FIGURE 1, a railway car embodying this invention is identified generally by the reference numeral 11. The railway car 11 has a freight receiving chamber 12 defined partially by vertically extending side walls 13 and 14. A door opening 15 is formed in the side wall 14 and a similar door opening (not shown) is formed in the side wall 13. The side walls 13 and 14 are formed from sheet metal or some other material that provides a smooth inner surface and are provided with a plurality of pairs of generally rectangular apertures 16 at spaced horizontal and vertical distances along their length and height.

A freight bracing system comprised of wall member assemblies 17 and 18, end wall member assemblies 19, 21 and 22, and a doorway member assembly 23 is provided within the freight receiving chamber 12. Each of the wall members 17 and 18, end wall members 19, 21 and 22, and the doorway member 23 are provided with a plurality of equally spaced rectangular apertures 24. Adjacent pairs of the apertures 24 are spaced at substantially the same center distance as the pairs of apertures 16 in the side walls 13 and 14. The apertures 24 also are of substantially the same shape as the wall apertures. Crossbar assemblies 25 are provided that span the wall members, end members or door members on opposite sides of the car to brace freight that may be contained within the freight receiving chamber 12.

Referring now to FIGURES 2 and 3, each of the crossbar assemblies 25 comprises a tubular elongated body 26 having a generally square cross-section and formed preferably from aluminum. A pair of end fittings 27 and 28 are telescopically received in each end of the tubular member 26. Since each of the end fittings 27 and 28 is substantially the same, with the exception of differences which will become more apparent as this description proceeds, identical parts have been identified by common numbers. Each end fitting is comprised of a shank 29 formed by a pair of channel shaped members 30 and 31 having facing legs which are welded along their length to form a generally box-shaped section. An end fitting forging 32 is provided at the outer end of the shank 29. The forging 32 has a pair of outwardly extending locating pin parts 33 and 34 having a generally rectangular outer configuration, as shown in more detail in FIGURE 4. A pair of vertically extending slots 35 and 36 extend upwardly from the base of the forging 32 and intersect the locating pin parts 33 and 34. A base surface 37 extends between the locating pin parts 33 and 34 and the inner edges of the slots 35 and 36.

An inverted generally channel shaped member having depending legs 38 and 39 and a web 41 with a cutout portion 42 is welded to the back of the forging 32. The legs 38 and 39 are formed with arcuate recesses 43 that pivotally receive cylindrical portions 44 of a latch member, indicated generally by the reference numeral 45. In assembly, the latch member cylindrical portions 44 are positioned within the recesses 43 and the end forging 32 and the channel shaped member which has been affixed to it is slid into the open end of the shank 29. When the rear surface of the forging 32 abuts the outer surface of the shank 29, the elements are welded together. This results in the latch member 45 being pivotally connected to the shank 29.

The latch member 45 has a pair of outwardly extending jaw elements 46 and 47 that project through the slots 35 and 36, respectively, in the forging 32. An upwardly extending release arm 48 is formed integrally with the latch member 45. The latch member 45 is urged to its latching position by a leaf type latch spring 49 that has an end which contacts the upper surfaces of the latch jaw elements 46 and 47 and has another end that is fixed to the web 41 of the channel member by a rivet 51. Circular apertures 52 and 53 are formed in the channel members 30 and 31, respectively, to permit release of the latch member 45 from either above or below the crossbar assembly 25.

Each of the end fittings 27 and 28 is telescopic within the respective end of the tubular member 26 by sliding the shanks 29 within the respective ends of the tubular member 26. A generally rectangular stop block 55 is affixed to one side of the shank 29 of the end fitting 27 to limit the degree of inward movement of it with respect to the tubular member 26. A similar stop block 56 is affixed to the side of the end fitting 28 to limit its inward movement.

A generally rectangular aperture 57 and a smaller generally rectangular aperture 58 are formed in the upper surface of the tubular member 26 adjacent the end fitting assembly 27. An elongated rectangular slot 59 is formed in the upper surface of the shank 29 of the end fitting 27 in alignment with the apertures 57 and 58. A spring clip, indicated generally by the reference numeral 61, has an intermediate portion 62 that lies along the upper surface of the tubular member 26. An offset ear 63 of the spring clip 61 extends through the aperture 58 and bears against the inner surface of the shank 29. A clip end 64 extends through the aperture 57 and engages the inner surface of the tubular member 26. The clip 61 insures that the end fitting 27 can not accidentally be removed from the tubular member 26. A similar clip 65 is provided on the lower side of the tubular member 26 to insure against accidental removal of the end fitting 28.

In the illustrated embodiment, the end fitting 28 may be considered to be telescopic and the end fitting 27 may be considered to be a fixed end fitting, although its longitudinal position with respect to the tubular member 26 may be altered between one of two spaced locations for reasons which will become more apparent as this description proceeds. A latch assembly, indicated generally by the reference numeral 66, is carried internally of the shank 29 of the end fitting 27 to fix it with respect to the tubular member 26. The latch assembly 66 includes a supporting member 67 having an aperture 68 that slidably receives a locking pin 69. The supporting member 67 is affixed, as by welding, to the shank 29. An enlarged end 71 of the locking pin 69 is adapted to extend through one of two longitudinally spaced apertures 72 and 73 in the lower surface of the tubular member 26. A coil spring 74 bears against a shoulder 75 formed on the locking pin 69 and the supporting member 67 to urge the pin portion 71 into the respective aperture. The length of the crossbar assembly 25 depends upon which of the apertures 72 or 73 the locking pin 69 is received in. The crossbar assembly 25 is shown in its shorter length in FIGURES 2 and 3.

It will be noted that, with the exceptions mentioned, the end fittings are identical. This is particularly true with respect to the end forgings 32 and latch member 45. Thus, a minimum number of different parts are required.

Referring now to FIGURES 5 and 6, the locating pin parts 33 and 34 of the end forging 32 of the fixed end fitting 27 are inserted into the apertures 24 of the wall members 17 and 18, or end members 19, 21 and 22 or doorway member 23, in this case the wall member opposite the wall member 17. To insert the locating pin parts 33 and 34 into the apertures 24, the latch member 45 is pivoted against the action of the latch spring 49 so that the lower ends of the jaws 46 and 47 will clear the adjacent surface of the member to which the crossbar assembly 25 is being affixed. When the locating pin parts 33 and 34 are received within the apertures 24, the latch member 45 is released and the latch spring 49 will urge the latching jaws 46 and 47 into engagement with the member and affix the crossbar assembly 25 to it.

The opposite end fitting 28 is inserted into the wall member 17 in a like manner. The telescoping movement of the end fitting 28 assists in compensating for differences in car width, particularly as occurs during motion of the car. The telescoping action also assists in locating the crossbar 25 upon the walls during bracing. If it is desired to remove the crossbar assembly 25 from within the freight receiving chamber 12, the latch 45 is released and the end fitting assembly 28 is telescoped within the tubular member 26 to provide sufficient longitudinal clearance to remove the crossbar assembly 25 from the area.

As may be best understood by reference to FIGURE 6, it will be noted that the locating pin parts 33 and 34 have inner surfaces 81 and 82, respectively, that are spaced apart a lesser distance than the latch jaws 46 and 47 in their plane of pivotal movement. This spacing insures that the latch jaws 46 and 47 will always be spaced within the apertures 24 and will not engage the portion of the wall member 17 between the apertures 24. Thus, the latch assembly 45 will not take any transverse loading, such loading being taken by the forging 32.

Referring again to FIGURE 1, it will be noted that the pairs of apertures 16 in the side walls 13 and 14 are spaced much more widely from each other than the apertures 24 in the wall members, end members and doorway members. The apertures 24, therefore, permit a finer adjustment in the location of the crossbar assemblies 25. In some instances, the wall members need not be utilized and the crossbar assemblies 25 may be affixed directly to the side walls 13 and 14. To accomplish this, the latch assembly 66 (FIGURES 2 and 3) is released from the aperture 72 and the end fitting 27 is extended. The locking pin 69 is engaged with the aperture 73, the spacing between the apertures 72 and 73 corresponding to the difference in width between the side walls 13 and 14 and the thickness of the wall members 17 and 18. If this adjustment is not desired, however, the end fitting 27 may be rigidly affixed to the tubular member 26, by any suitable fastening means but preferably by one that will permit removal and servicing of the end fitting 27.

Referring now to FIGURES 7 and 8, each of the side walls, the side wall 14 being shown, is provided with a plurality of vertically extending hat-shaped members 83 having outwardly extending legs 84 and 85 that are affixed to the outer surface of the side walls in vertical alignment with a series of vertically aligned pairs of the apertures 16. A strapping engaging backup rod 86 extends between the apertures 16 and overlies them slightly (FIGURE 8). The backup rod 86, therefore, alters the shape of the aperture 16 that is presented to the end forging 32. The shape of the side surfaces 81 and 82 of the pin parts 33 and 34 is such that they will engage the opposite sides of the backup rod 86 to protect the latch parts 46 and 47 upon lateral movement of the crossbar assembly 25 in the same manner as they protected them with respect to the wall member assembly 17. The outer surfaces of the locating pin parts 33 and 34 are inclined inwardly so that they will not interfere with the hat-shaped section 83 when the crossbar assembly 25 is supported by the walls 13 and 14.

Referring now to FIGURES 5, 9, 10 and 11 each of the wall members 17 and 18 comprise an elongated channel shaped member 86. The apertures 24 are formed in the web of the channel shaped member 86. A latch assembly, indicated generally by the reference numeral 87, is provided at each end of the channel shaped member 86. Each latch assembly 87 includes a generally L-shaped bracket 88 that is affixed to the channel shaped member 86 with its long leg 89 extending parallel to the web of the channel shaped member 86. A fixed hook 91 is affixed, as by welding, to the L-shaped member 88. A locking pin assembly 92 having an integral depending hook portion 93 is supported adjacent the fixed hook 91. The hook portion 93 extends through a rectangular aperture 94 formed in the leg 89. The locking pin assembly 92 also includes an integral pin 95 that extends from the hook 93 through an aperture in the upper leg of the channel shaped member 86. A coil spring 96 bears against the leg and the locking pin assembly 92 to urge the hook 93 downwardly into engagement with the surface of the wall 13 below the aperture 94. A larger integral pin 97 depends from the lower end of the locking pin assembly 92 and extends through an aperture 98 in the lower leg of the channel shaped member 86.

To remove the wall member 17 from its assembled position on the side wall 13, as shown in the drawings, the pin 97 is urged upwardly compressing the coil spring 96. This causes the depending end of the hook 93 to clear the lower end of the aperture 16 in the side wall 13. The lower end of the wall member 17 is then pivoted outwardly from the side wall 13. A relief 99 formed on the fixed hook 91 and a similar relief 100 formed on the hook 93 facilitate clearance of these members through the aperture 16. When the hook 93 is clear of the aperture 16, the upper end of the fixed hook 91 may be dropped from the aperture 16 to completely remove the wall member 17 from the side wall 13. The contact of the hook 93 with the upper end of the aperture 94 limits the degree the hook 93 may be raised. In assembly, the upper end of the fixed hook 91 is first inserted through the aperture 16 and then the lower end inserted in the manner opposite to that previously described.

The latch assembly 87 at each end of the wall members 17 and 18 cooperates with only a single one of the pair of apertures 16. This construction is adopted so that a pair of wall members may be positioned adjacent to each other in abutting relationship at their ends. In a like manner, the end members 19, 21 and 22 have a similar latch assembly 87 formed at one of their ends so that they may be positioned in abutment with the wall members, as shown in FIGURE 5. This construction permits the wall members and end members to extend completely along the length of the car, if desired, to provide what is the equivalent of a belt rail. Since the latch assemblies 87 are positioned at the ends of the wall members, a minimum amount of overhang will exist between adjacent wall members. The same is true with respect to the relationship between the wall members and one end of the end members. A slightly different locking arrangement is provided at the other end of the end members 19, 21 and 22 due to their locations with respect to the side walls 13 and 14.

As seen in FIGURE 1, the rows of apertures 16 adjacent the corner of the car and adjacent the doorways 15 are spaced from the corner and doorway. To span this gap, end members 19 extended from the latch that engages the apertures 16 to the corner of the car or to the doorway 15 in the manner best shown in FIGURE 12. As seen in FIGURE 12, the end member 21 also comprises a channel shaped member in which the apertures 24 are formed. A latch assembly 101 is provided that is identical to the latch assembly 87 previously described and thus will not be described in detail. In this embodiment, the latch assembly 101 is spaced laterally inwardly from the end of the end member 21. In addition, a second fixed hook 102 is provided to cooperate with the aperture 16 adjacent that with which the latch assembly 101 cooperates.

The latch assembly 101 and fixed hook 102 are supported by a generally U-shaped member 103 having offset ends 104 and 105 that are welded between the legs of the channel shaped member in which the apertures 24 are formed. The leg 105 adjacent the end of the end member 21 is formed with an elongated vertical slot 106. The slot 106 is adapted to receive an end of the door member 23 when the end member 21 is positioned adjacent the doorway 15.

Referring now to FIGURE 13, the door member 23 comprises a structural channel 107 in which the rectangular apertures 24 are formed at equal distance along its length. A fixed end socket 109 is welded to a pair of plates 111 and 112 which are, in turn, welded to the legs of the channel 107 at one end of the door member 23. At the other end of the door member 23, a sliding socket member 113 is supported by a pair of guides 114 and 115 which are, in turn, welded to plates 116 and 117. The plates 116 and 117 are welded to the channel 107. A coil spring 118 bears against the plate 117 and the inner end of the sliding socket member 113 to urge it outwardly with respect to the channel 107. A rod 119 supports the spring 118.

When it is desired to insert the door member 23 into the car, the fixed socket 109 is slid into the respective aperture 106 formed in the adjacent end member 22. The sliding socket 113 is then slid into the respective end of the door member 23 by compression of the coil spring 118. When the adjacent end of the door member 23 registers with the adjacent aperture 106 in the respective end member 21, the sliding socket 113 is released so that it will enter the aperture 106. The door member 21 will then be fixed across the doorway 15. It should be readily apparent that crossbar assemblies 25 may be positioned within the apertures 24 of the door member 23 so that freight which is positioned adjacent the doorway 15 may be braced by them. Thus, support means for the crossbar assemblies 25 may be provided along the full length of the car or at any desired location along it.

Various forms of apertures may be provided in the side walls of the railway car or other device in which the described freight bracing apparatus is used. The apertures described in the previous embodiment are of a type used by one railway line. Another railway line uses apertures of the type shown in FIGURES 14 and 19. A slightly different end fitting arrangement for the crossbars and latch assembly for the wall and end members are used in conjunction with these apertures for reasons which will become more apparent as this description proceeds.

Referring now to the embodiment shown in FIGURES 14 through 19, a railway car embodying this invention is illustrated partially and is identified generally by the reference numeral 151. The railway car 151 includes a freight storage area 152 defined in part by a side wall 153 having a door opening 154 formed therein. The side wall 153 is of a sheet metal construction and is provided with a plurality of pairs of apertures 155 and 156.

Figure 16:
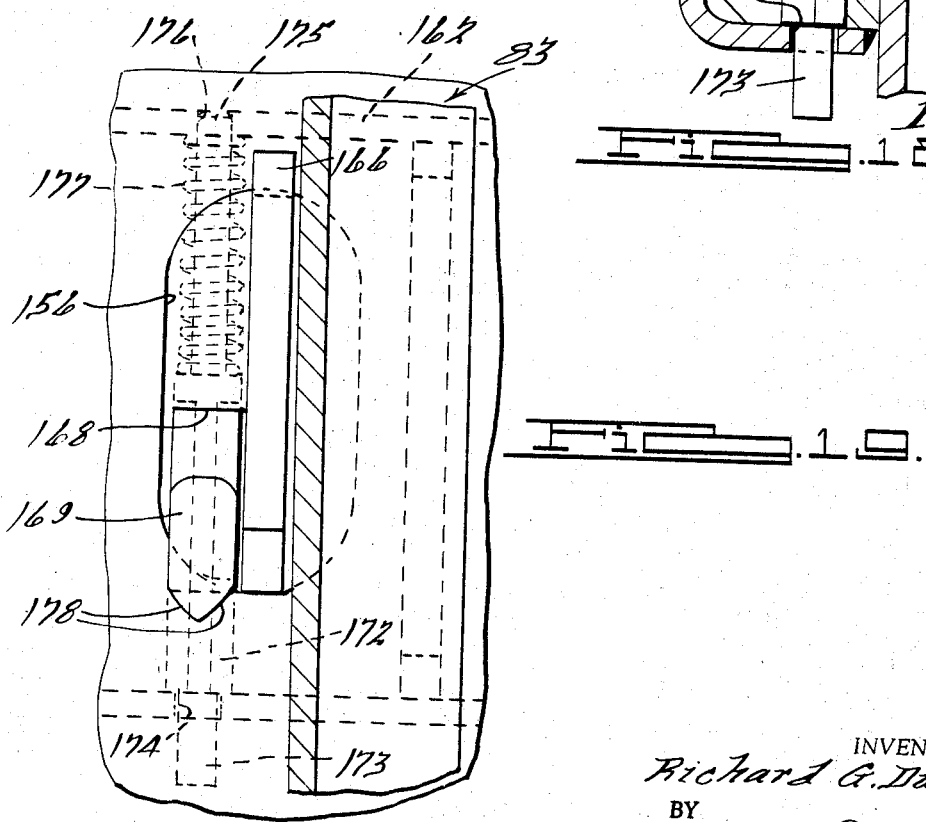
FIGURE 16 is an enlarged elevational view of the encircled area in FIGURE 14.

Referring particularly to FIGURE 16, it will be seen that the apertures 155 and 156 are generally oval in shape. A hat-shaped reinforcing member, similar to that disclosed in the previous embodiment, backs up the side wall 153 adjacent the apertures 155 and 156. The hat-shaped member has legs 157 and 158 affixed to the inner surfaces of the side wall 153. The legs 157 and 158 overlie half of each of the apertures 155 and 156, respectively. The opening presented by the apertures, therefore, is in the form of a pair of facing D-shaped apertures.

As in the previously described embodiment, wall members 159 may be affixed to the side wall 153 in cooperation with the apertures 155 and 156. In addition to the plane wall members 159, end members and door members (not shown) similar to those previously described may be used. Crossbar assemblies indicated generally by the reference numeral 161, span the wall members 159 or apertures 155 and 156 in the wall 153 to brace freight within the storage area 152.

The wall members 159 are substantially the same as those previously described with the exception of the latch mechanism for securing them to the side wall 153 and the shape of the apertures within them. Each of the wall members 159 comprises a channel-shaped member 162 in which pairs of spaced facing D-shaped apertures 163 and 164 are formed. The apertures 163 and 164 correspond in shape and spacing to the openings that are presented by the apertures 155 and 156 in the side wall 153.

A latch mechanism, indicated generally by the reference numeral 165 and shown in more detail in FIGURES 18 and 19, is provided to affix the wall members 159 to the side wall 153. The latch mechanism 165 includes a fixed jaw 166 that is affixed, as by welding, to a plate 167 that spans the legs of the channel shaped member 162. A rectangular aperture 168 is formed in the plate 167 at one side of the fixed jaw 166. The rectangular aperture 168 receives a forwardly extending jaw 169 of a latch member 171. As in the previously described embodiment, the jaw 169 contacts the side of the aperture 168 so that it will not rotate with respect to the wall member 159. The jaw 169 is formed integrally with an elongated member 172 that has an integral pin 173 at its lower end. The pin 173 projects through an aperture 174 formed in the lower leg of the channel shaped member 162. An elongated rod shaped end 175 is formed integrally with the upper end of the member 172. The rod shaped end 175 is guided within an aperture 176 formed in the upper leg of the channel shaped member 162. A coil spring 177 is compressed between the upper leg and the shoulder formed between the rod shaped end 175 and the member 171 to urge the latch in a downward direction.

Referring to FIGURE 19 it will be noted that the jaw 169 is formed with a pair of arcuate reliefs 178 that are complementary in shape to the adjacent portion of the aperture 164. The reliefs 178 permit the jaw 169 to be released from the wall 153 with a minimum degree of vertical movement. It should be readily apparent that, if the jaw 169 were completely rectangular in shape, a higher degree of lift would be required for it to completely clear the aperture 156. The reliefs are provided on each side of the jaw 169 so that the jaw 169 may be used at each end of the wall member 159.

The crossbar assembly 161 is substantially the same in construction as that previously described with the exception of the end fitting. That is, it may be adjustable in length so that it may directly be fastened to the opposite side walls of the car or may be fastened to the wall members 159. Alternatively, one end of the crossbar assembly 161 may be fixed and the other telescopic to permit disengagement from the wall.

Figure 15:
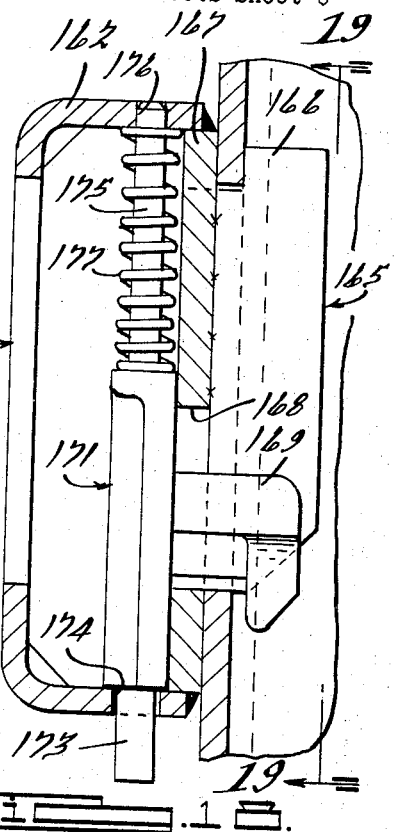
FIGURE 15 is an end view of the end fitting the crossbar shown in FIGURE 14.

Referring now to FIGURES 15 and 17, the end fittings are substantially the same as those previously described with the exception of the shape of the forgings and the locking jaws of the latch. The end forging 181 comprises a pair of facing generally D-shaped locating pins 182 and 183 that are adapted to be inserted into the apertures 163 and 164 of the wall members 159 or within the apertures 155 and 156 of the side wall 153. A base surface 184 is positioned between the pins 183 and 182 to engage the web of the channel 162 or the side wall 153 to limit the depth of insertion of the pin portions 182 and 183 into the respective apertures. A pair of rectangular slots 185 and 186 are formed on the inner sides of the locating pins 182 and 183 at their lower edge. Locking jaws 187 and 188 of a forked lock assembly that is pivotally supported adjacent the end forging 182 in the manner previously described, extend through the slots 185 and 186. It will be noted, as in the previously described embodiment, the locking jaws 187 and 188 are spaced inwardly of facing surfaces 191 and 192 of the locating pins 182 and 183 so that the locking jaws 187 and 188 will be protected upon side loading of the crossbar assembly 161. The inner surfaces of the locking jaws 187 and 188 are formed with reliefs, as at 193 and 194, as was the locking jaw 169 of the latch assembly 165 of the wall member 159. The reliefs 193 and 194 permit release of the locking mechanism with a minimum degree of movement to facilitate clearance over the corresponding surface of the D-shaped apertures in the side wall 153.

It should be apparent that the end fitting 181 shown in the embodiments of FIGURES 14 through 19 may be employed with rectangular apertures as in the previously described embodiments. Thus, it would be possible to provide a single crossbar which may be used with either shape of aperture. It should additionally be noted that it would be possible to provide rectangular apertures in the wall members 159 of the embodiment shown in FIGURES 14 through 19 provided crossbar assemblies of the type shown in the embodiment of FIGURES 1 through 13 were utilized in conjunction with them.

Various other changes and modifications may be made without departing from the spirit and scope of the invention, as defined by the appended claims.

What is claimed is:

1. An end fitting for securing a freight bracing crossbar to a support member having a plurality of spaced pairs of apertures therein comprising a pair of locating projections adapted to extend into each aperture of one of the pairs, and locking means comprising jaw members supported by said end fitting for pivotal movement from a disengaged to an engaged position for fixing said end fitting with respect to the support member, each of said jaw members being adapted to extend into one of the apertures of the one pair and having a portion thereof extending behind the surface of the support member when said jaw members are in their engaged position for precluding detachment of said end fitting from the support member, each of the locating projections having a surface thereof extending substantially in a plane parallel to the planes of pivotal movement of said jaw members, said surfaces being laterally displaced from the respective said jaw members and adapted to engage the adjacent surface of the support member to limit lateral movement of the end fitting with respect to the support member, said engagement being effective to protect said jaw members from damage upon said lateral movement, said locating projections being formed to allow pivotal movement of said jaw members between their engaged and disengaged positions.

2. A wall member adapted to be detachably connected to a pair of spaced apertures in a wall of a cargo area and providing means for attachment of a freight bracing crossbar thereto, said wall member comprising an elongated channel shaped body having cross member attachment means formed in the web thereof, fixed hook means operatively connected to said elongated body at opposite ends thereof, said fixed hook means being adapted to be attached to the respective selective ones of the apertures in the wall, and releasable hook means supported at said opposite ends of said elongated body for movement between engaged and disengaged positions, each of said releasable hook means facing in a direction opposite to the respective adjacent fixed hook means, at least one of said releasable hook means being supported for movement by means of a shank portion slidably received in apertures formed in the flanges of said body, said releasable hook means being adapted to be received in respective selected ones of the apertures in the wall, said fixed hook means and said releasable hook means cooperating with the wall and the apertures formed therein for detachably affixing said wall member to the cargo area wall.

References Cited
UNITED STATES PATENTS

| | | | |
|---|---|---|---|
| 2,091,869 | 8/1937 | McCurdy | 105—376 |
| 2,287,852 | 6/1942 | Zyara | 105—369 |
| 2,467,681 | 4/1949 | McKinney | 105—369 |
| 2,576,425 | 11/1951 | Thearle | 105—369 |
| 2,627,821 | 2/1953 | Sjogren | 105—369 |
| 2,873,695 | 2/1959 | Tobin | 105—369 |
| 2,901,987 | 9/1959 | Campbell et al. | 105—369 |
| 2,963,992 | 12/1960 | Schroeder | 105—369 |
| 2,994,285 | 8/1961 | Dunlap | 105—369 |
| 3,066,620 | 12/1962 | Schroeder | 105—369 |
| 3,070,044 | 12/1962 | Tobin | 105—369 |
| 3,074,740 | 1/1963 | Zastrow | 105—369 |
| 3,090,600 | 5/1963 | Smith | 105—369 |
| 3,114,335 | 12/1963 | Schroeder et al. | 105—369 |
| 3,227,102 | 1/1966 | Shook | 105—369 |
| 3,283,729 | 11/1966 | Lamport et al. | 105—376 |

ARTHUR L. LA POINT, *Primary Examiner.*

DRAYTON E. HOFFMAN, *Examiner.*